(12) United States Patent
Sung et al.

(10) Patent No.: US 12,240,402 B2
(45) Date of Patent: Mar. 4, 2025

(54) ROOF-MOUNTED AIRBAG

(71) Applicants: Hyundai Motor Company, Seoul (KR); Kia Corporation, Seoul (KR); Hyundai Mobis Co., Ltd., Seoul (KR)

(72) Inventors: Il Chang Sung, Gyeonggi-do (KR); Byung Ho Min, Gyeonggi-do (KR)

(73) Assignees: Hyundai Motor Company, Seoul (KR); Kia Corporation, Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/897,342

(22) Filed: Aug. 29, 2022

(65) Prior Publication Data

US 2023/0294630 A1  Sep. 21, 2023

(30) Foreign Application Priority Data

Mar. 17, 2022  (KR) .......... 10-2022-0033528

(51) Int. Cl.
*B60R 21/214* (2011.01)
*B60R 21/215* (2011.01)
*B60R 21/232* (2011.01)
*B60R 21/231* (2011.01)

(52) U.S. Cl.
CPC .......... *B60R 21/214* (2013.01); *B60R 21/215* (2013.01); *B60R 21/232* (2013.01); *B60R 2021/23161* (2013.01)

(58) Field of Classification Search
CPC ... B60R 21/214; B60R 21/215; B60R 21/232; B60R 2021/23161
See application file for complete search history.

(56) References Cited

U.S. PATENT DOCUMENTS

| | | | |
|---|---|---|---|
| 8,579,321 B2* | 11/2013 | Lee | B60R 21/233 |
| | | | 280/729 |
| 10,703,320 B2* | 7/2020 | Farooq | B60R 21/231 |
| 11,465,579 B1* | 10/2022 | Faruque | B60R 21/233 |
| 2021/0197748 A1* | 7/2021 | Jeong | B60R 21/2338 |
| 2022/0126775 A1* | 4/2022 | Farooq | B60N 2/01 |
| 2022/0203923 A1* | 6/2022 | Jaradi | B60R 21/264 |
| 2022/0348161 A1* | 11/2022 | Faruque | B60R 21/231 |

FOREIGN PATENT DOCUMENTS

KR  10-2021-0083515 A  7/2021

* cited by examiner

*Primary Examiner* — Jason D Shanske
*Assistant Examiner* — Matthew James O'Neill
(74) *Attorney, Agent, or Firm* — Fox Rothschild LLP

(57) ABSTRACT

Provided is a roof-mounted airbag configured to reduce the risk of injury to a passenger by minimizing movement of a cushion when the passenger is placed on the cushion. The roof-mounted airbag includes a cushion, formed in a cylindrical shape and configured to be deployed downwards between passengers facing each other while left and right upper ends thereof are fixed to a roof part, and an inflator configured to provide gas to an inside of the cushion.

19 Claims, 15 Drawing Sheets

ROOF-MOUNTED AIRBAG

CROSS-REFERENCE TO THE RELATED APPLICATION

This application is based on and claims under 35 U.S.C. § 119(a) the benefit of Korean Patent Application No. 10-2022-0033528, filed on Mar. 17, 2022, in the Korean Intellectual Property Office, the disclosure of which is incorporated herein by reference in its entirety.

TECHNICAL FIELD

The present disclosure relates to a roof-mounted airbag configured to reduce the risk of injury to a passenger by minimizing the movement of a cushion when the passenger is placed on the cushion.

BACKGROUND

An autonomous vehicle provides various seat arrangements such as a long rail seat, a swiveling seat, and a relaxation seat.

Accordingly, in order to safely protect a passenger seated on the seat, a restraint device such as an airbag is mounted in various ways not only in the seat but also in the interior of a vehicle.

Meanwhile, in the case of the interior of a vehicle in which seats are installed facing forwards and rearwards, an airbag is mounted on a roof part located between a front seat and a rear seat.

Accordingly, in the event of vehicle collision, a cushion installed in the roof part is deployed downwards and is expanded towards a passenger seated on the seat, and the passenger is placed on the front or the rear of the cushion, thereby protecting the passenger from the vehicle collision.

However, as shown in FIG. 1, when a passenger, located in the opposite direction of collision, hits a cushion 1, the cushion 1 is pushed and moved toward a passenger located in the collision direction.

In the state in which the cushion is being pushed as described above, when the cushion is supported by the passenger located in the collision direction and the cushion is no longer pushed, tension is increased at the upper end of the cushion hit by the passenger and energy is concentrated at the upper end thereof, which leads to a neck injury of the passenger who hits the cushion 1.

The information disclosed in this Background of the Disclosure section is only for enhancement of understanding of the general background of the disclosure, and should not be taken as an acknowledgement or any form of suggestion that this information forms the related art already known to a person skilled in the art.

SUMMARY

Therefore, the present disclosure has been made in view of the above problems, and it is an object of the present disclosure to provide a roof-mounted airbag configured to reduce the risk of injury to a passenger by minimizing the movement of a cushion when the passenger is placed on the cushion.

In accordance with the present disclosure, the above and other objects can be accomplished by the provision of a roof-mounted airbag including a cushion configured to be deployed downwards between passengers facing each other while left and right upper ends thereof are fixed to a roof part, the cushion once deployed forming an empty space in the middle thereof, and an inflator configured to provide gas to an inside of the cushion.

In some embodiments, the left and right upper ends of the cushion may be fixed to front and rear sides of the roof part.

In some embodiments, the cushion and the roof part are connected to each other using a mounting tab.

In some embodiments, the roof-mounted airbag is implemented in a cylindrical shape with an open top.

In some embodiments, the side support parts are in a quadrangular shape.

In some embodiments, the cushion may include side support parts respectively formed on left and right sides thereof, each of the side support parts having an upper end including a fill chamber formed therein and filled with gas.

In some embodiments, the cushion may include side support parts respectively formed on left and right sides thereof, each of the side support parts having a central portion including an inactive zone formed therein and not filled with gas, and the inactive zone may have an edge portion formed therearound, the edge portion including a fill chamber formed therein and filled with gas.

In some embodiments, the cushion may include a bottom support part forming a bottom thereof, the bottom support part having front and rear ends respectively facing passengers, each of the front and rear ends including a fill chamber formed therein and filled with gas.

In some embodiments, the cushion may include a bottom support part forming a bottom thereof, the bottom support part having a central portion including an inactive zone formed therein and not filled with gas, and the inactive zone may have an edge portion formed therearound, the edge portion including a fill chamber formed therein and filled with gas.

In some embodiments, the cushion may include passenger support parts, each of the passenger support parts forming a corresponding one of front and rear sides of the cushion and having a panel structure made of a fabric material.

In some embodiments, the cushion may include side support parts, respectively forming left and right sides thereof, and a bottom support part, forming a bottom thereof, the side support parts and the bottom support part being formed to be integrated with each other, the passenger support parts may have lower ends, each of the lower ends being connected to a corresponding one of front and rear sides of the bottom support part, and the passenger support parts may have left and right sides, each of the left and right sides being connected to a corresponding one of front and rear sides of the side support parts.

In some embodiments, each of the side support parts may include an inflator connected thereto so that gas is first supplied to the side support part and then the gas is supplied to the bottom support part.

In some embodiments, the cushion may include passenger support parts, each of the passenger support parts forming a corresponding one of front and rear sides of the cushion and including a fill chamber formed therein and filled with gas.

In some embodiments, the cushion may include side support parts, respectively forming left and right sides thereof, a bottom support part, forming a bottom thereof, and the passenger support parts, the side support parts, the bottom support part, and the passenger support parts being formed to be integrated with each other, and the passenger support parts may have left and right sides, each of the left and right sides being connected to a corresponding one of front and rear sides of the side support parts.

In some embodiments, each of the side support parts may include an inflator connected thereto so that gas is first supplied to the side support part and then the gas is supplied to the bottom support part and the passenger support part.

In some embodiments, the cushion may be installed in seats, each of the seats being disposed along a left-and-right width direction.

In some embodiments, the roof part may include a cushion cover coupled thereto, and the cushion integrally formed between the roof part and the cushion cover may be distributed and accommodated on the left and right sides.

In some embodiments, the cushion may have a side surface formed in a cylindrical shape having one of a trapezoidal shape, a hemispherical shape, and a rectangular shape.

In some embodiments, each of front and rear surfaces of the cushion may include a fill chamber formed therein and filled with gas, the fill chamber forming a "U" shape.

In another embodiment, vehicles are provided that comprise a roof mounted airbag as disclosed herein.

In a fully autonomous vehicle or system, the vehicle may perform all driving tasks under all conditions and little or no driving assistance is required from a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
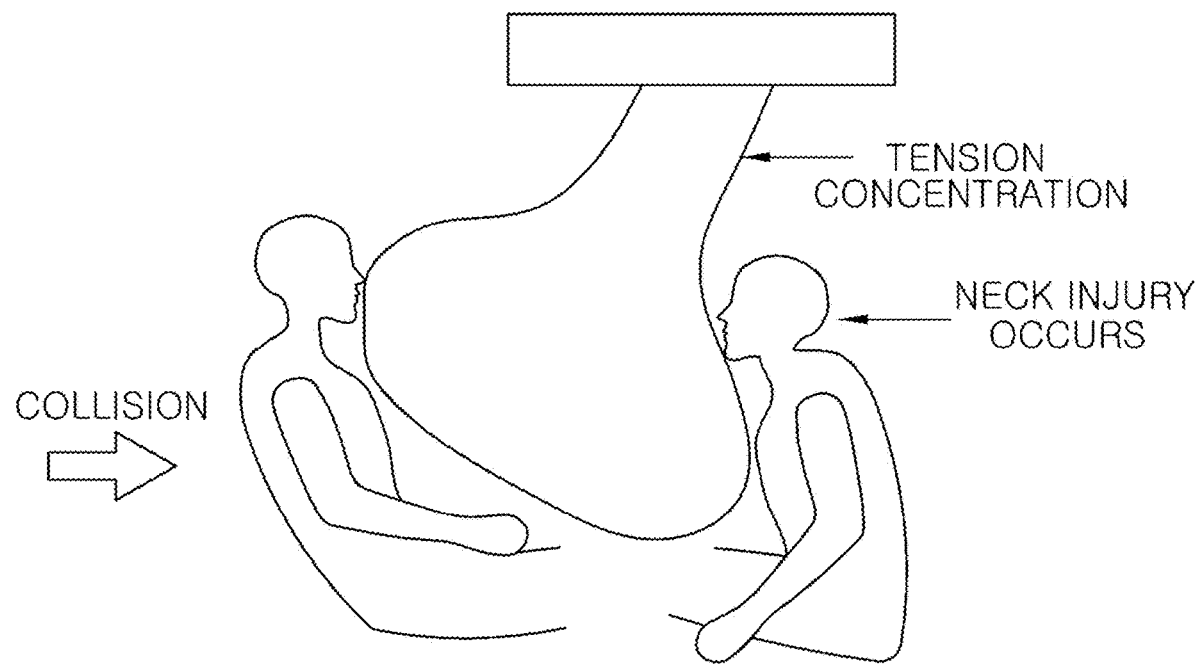
FIG. 1 is a view showing a movement of a roof-mounted airbag of the related art.

Specific structural or functional descriptions made in connection with the embodiments of the present disclosure disclosed in this specification or application are merely illustrative for the purpose of describing embodiments according to the present disclosure. Further, the present disclosure may be implemented in various forms, and should not be construed as being limited to the embodiments described in this specification or application.

Since the embodiments according to the present disclosure may be variously modified and may have various forms, specific embodiments are illustrated in the drawings and described in detail in this specification or application. However, it should be understood that the embodiments according to the concept of the present disclosure are not intended to be limited to the specific disclosed forms, and include all modifications, equivalents, and substitutes that fall within the spirit and technical scope of the present disclosure.

Meanwhile, in the present disclosure, terms such as "first" and/or "second" may be used to describe various components, but the components are not limited by the terms. The terms are used only for the purpose of distinguishing one component from other components. For example, a first component may be referred to as a second component, and similarly, a second component may also be referred to as a first component without departing from the scope of rights according to the concept of the present disclosure.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that no other components are present therebetween. Other expressions for the description of relationships between components, such as "between" and "directly between" or "adjacent to" and "directly adjacent to", should be interpreted in the same manner.

The terms used in the specification are only used to describe specific embodiments, and are not intended to limit the present disclosure. In this specification, an expression in a singular form also includes the plural sense, unless clearly specified otherwise in context. It should be understood that expressions such as "comprise" and "have" in this specification are intended to designate the presence of indicated features, numbers, steps, operations, components, parts, or combinations thereof, but do not exclude the presence or addition of one or more features, numbers, steps, operations, components, parts, or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless otherwise defined, all terms used herein, including technical and scientific terms, have the same meanings as commonly understood by those skilled in the art to which the present disclosure pertains. Terms such as those defined in commonly used dictionaries should be interpreted as having meanings consistent with their meanings in the context of the related technology. Further, unless explicitly defined in this specification, the terms should not be interpreted in an ideal or overly formal sense.

Hereinafter, the present disclosure will be described in detail by describing preferred embodiments thereof with reference to the accompanying drawings.

Figure 2:
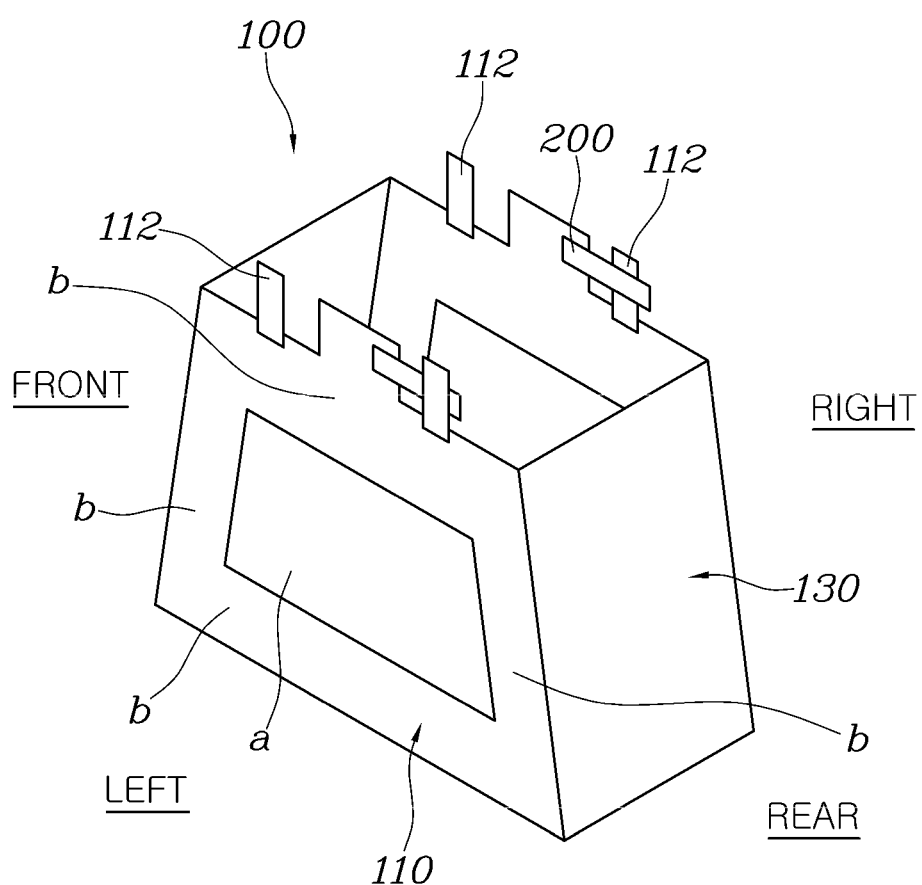
FIG. 2 is a view showing a shape of a first embodiment of a roof-mounted airbag according to the present disclosure.
Figure 3:
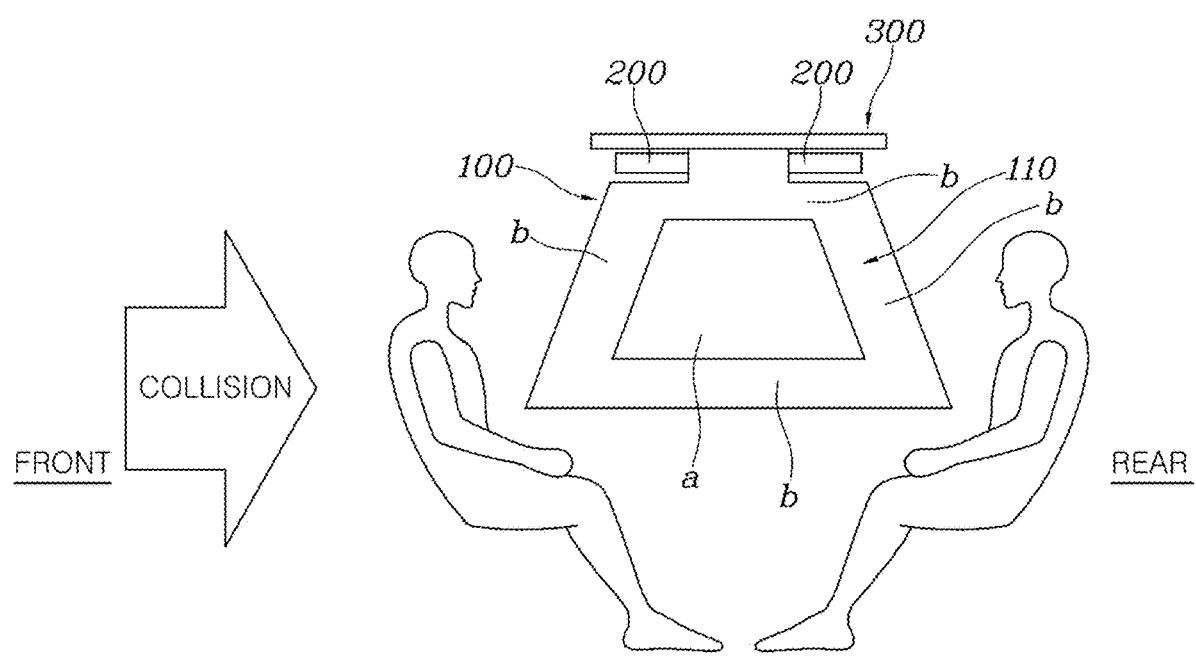
FIG. 3 is a view showing a deployed state of the roof-mounted airbag according to the present disclosure.
Figure 4:
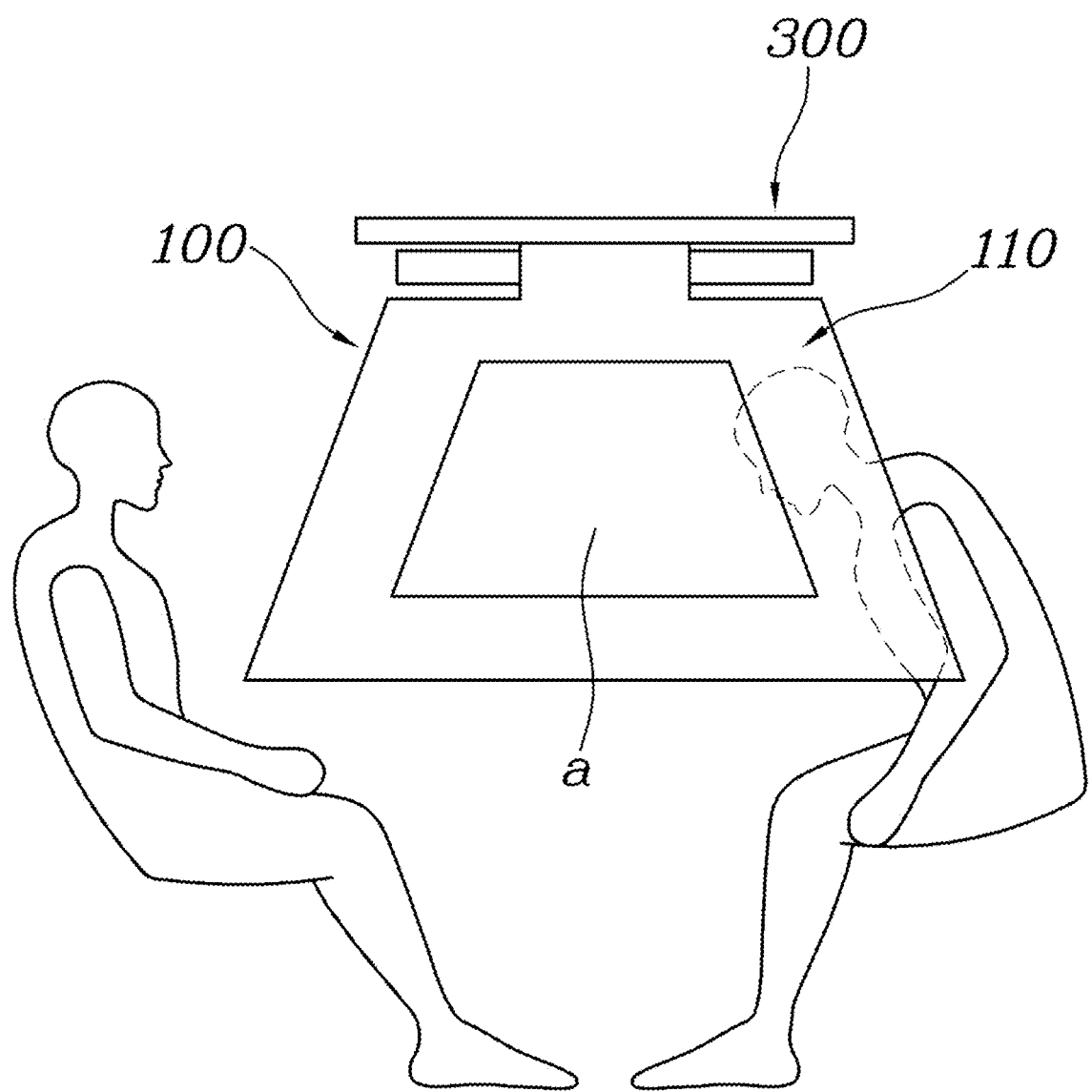
FIG. 4 is a view showing the state in which a passenger is placed on a cushion in FIG. 3.

FIG. 2 is a view showing a shape of a first embodiment of a roof-mounted airbag according to the present disclosure, FIG. 3 is a view showing a deployed state of the roof-mounted airbag according to the present disclosure, and FIG. 4 is a view showing the state in which a passenger is placed on a cushion 100 in FIG. 3.

Referring to the drawings, the roof-mounted airbag of the present disclosure includes the cushion 100, formed in a cylindrical shape and deployed downwards between passengers facing each other while left and right upper ends thereof are fixed to a roof part 300, and an inflator 200 configured to provide gas to the inside of the cushion 100.

Specifically, the roof-mounted airbag of the present disclosure may be suitably applied to a seat structure in which a front seat and a rear seat face each other. Here, in the roof-mounted airbag, an airbag module including the cushion 100 is embedded in the center portion of the roof part 300 positioned between the front seat and the rear seat.

Particularly, the left and right upper ends of the cushion 100 may be respectively fixed to the roof part 300.

Further, in the event of vehicle collision, the cushion 100 of the airbag embedded in the roof part 300 is deployed downwards into a space between the front seat and the rear seat.

In this manner, the cushion 100 may be deployed in a 3D cylindrical shape, the bottom surface of which is blocked and the circumference thereof is surrounded.

Therefore, in the event of vehicle collision, the head of a passenger may be placed on the cushion 100. However, since the cushion 100 is formed in a cylindrical shape and the left and right upper ends thereof are respectively fixed to the roof part 300, it is possible to minimize the movement of the cushion 100 toward the opposite passenger and to stably restrain the body of the passenger placed on the cushion 100, thereby reducing the risk of injury to the passenger.

Further, in the present disclosure, the left and right upper ends of the cushion 100 may be fixed to the front and rear sides of the roof part 300, respectively.

For example, the cushion 100 and the roof part 300 may be connected to each other using a mounting tab 112 made of a fabric material, and the mounting tabs 112 may be respectively connected to the front and rear ends on the left and right sides of the cushion 100.

That is, the lower end of each mounting tab 112 may be fixed to the upper end of the cushion 100, and the upper end of each mounting tab 112 is fixed to a module housing bracket 330 coupled to the roof part 300.

Therefore, when the passenger is placed on the cushion 100, it is possible to reliably prevent the cushion 100 from moving toward the opposite passenger or from swinging, thereby more stably restraining the body of the passenger placed on the cushion 100.

In addition, as shown in FIGS. 2 to 4, in the present disclosure, each of the upper ends of side support parts 110, respectively forming the left and right sides of the cushion 100, may be formed of a fill chamber b filled with gas.

For example, the side support parts 110 may be respectively formed on the left and right sides of the cushion 100 formed in a cylindrical shape, and the upper ends of the side support parts 110 are deployed with a structure having the fill chamber b in the forward-and-rearward longitudinal direction.

Therefore, the upper ends of the side support parts 110 may be fixed to the front and rear sides of the roof part 300, respectively, and as such, support rigidity is provided in the forward-and-rearward longitudinal direction by gas filling the upper ends of the side support parts 110, thereby restricting swing movement of the cushion 100 when the passenger is placed on the cushion 100. Accordingly, it is possible to more stably restrain the body of the passenger.

Figure 5:
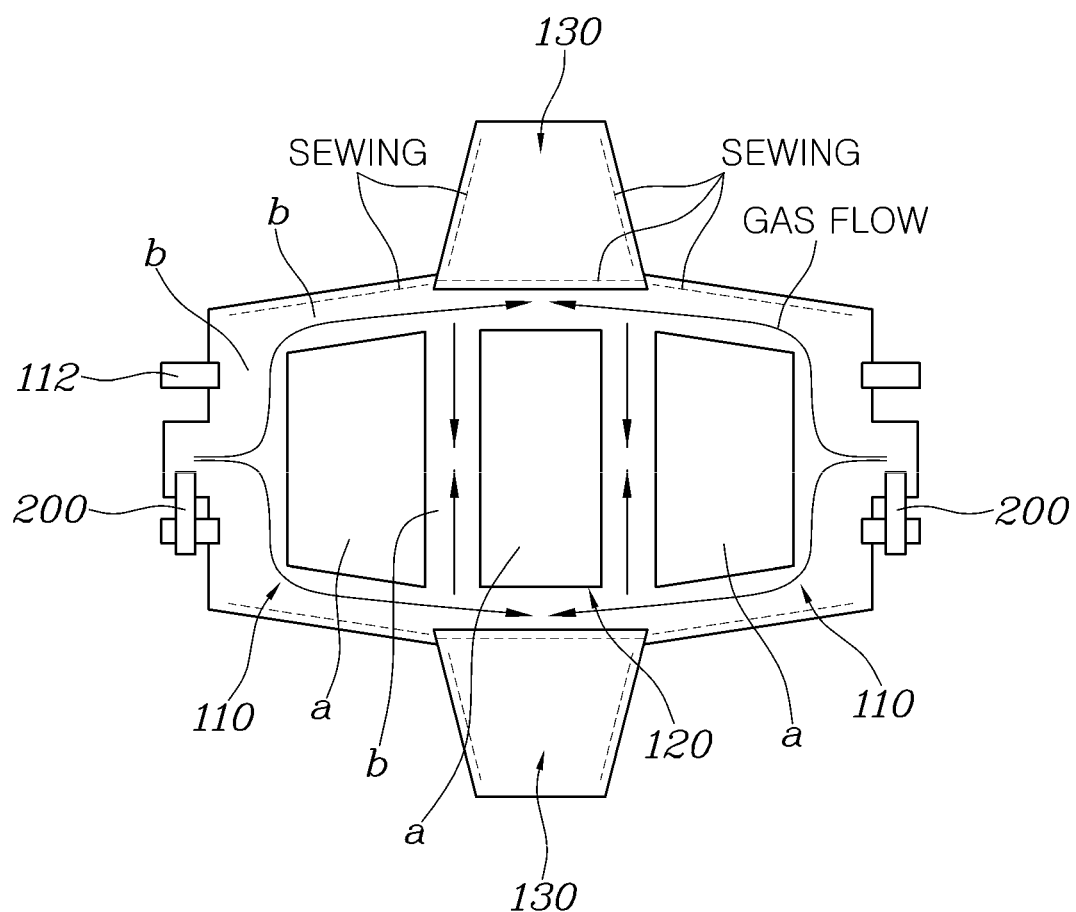
FIG. 5 is a view showing an unfolded structure in which a passenger support part in FIG. 2 is formed of a panel.

FIG. 5 is a view showing an unfolded structure in which a passenger support part 130 in FIG. 2 is formed in a panel shape.

Referring to the drawing, in the present disclosure, an inactive zone a, which is not filled with gas, may be formed in each of the central portions of the side support parts 110 respectively forming the left and right sides of the cushion 100. Further, a fill chamber b, which is filled with gas, may be formed along the edge portion surrounding the inactive zone a.

That is, in the case of the side support part 110, the inactive zone a may be located in the center portion, and a structure of the fill chamber b filled with gas is located along the edge portion of the inactive zone a, thereby securing the support rigidity of the side surface of the cushion 100.

In addition, according to the present disclosure, the front and rear ends of a bottom support part 120, forming the bottom of the cushion 100, may be formed of the fill chamber b filled with gas, the front and rear ends of the bottom support part 120 facing the passengers, respectively.

For example, the bottom support part 120 may be formed on the bottom surface of the cushion 100 formed in a cylindrical shape, and the front and rear ends of the bottom support part 120 are deployed with the structure of the fill chamber b in the left-and-right longitudinal direction.

Accordingly, the support rigidity may be provided in the left-and-right longitudinal direction by gas filling the front and rear ends of the bottom support part 120, and as such, a chest portion of the passenger is supported by the cushion 100 and collision energy is absorbed, thereby safely protecting the passenger.

Further, according to the present disclosure, in the bottom support part 120 forming the bottom of the cushion 100, the inactive zone a, in which gas is not filled, may be formed at the center portion, and the fill chamber b, in which gas is filled, may be formed along the edge portion surrounding the inactive zone a.

That is, the bottom support part 120 may implement the inactive zone a at the center portion thereof and the structure of the fill chamber b having gas filled along the edge portion surrounding the inactive zone a, thereby securing the support rigidity of the bottom surface of the cushion 100.

Meanwhile, referring to FIG. 5, in the present disclosure, the passenger support parts 130, respectively forming the front and rear sides of the cushion 100, may be formed in a panel structure made of a fabric material.

That is, the passenger support part 130 may be a part directly supporting the body of the passenger, and may be separately provided in the form of a panel made of a material of the cushion 100 to restrain the body of the passenger.

In the case of such a structure, the side support parts 110, respectively forming the left and right sides of the cushion 100, and the bottom support part 120, forming the bottom of the cushion 100, may be formed to be integrated with each other. Further, each of the lower ends of the passenger support parts 130 may be connected to a corresponding one of the front and rear sides of the bottom support part 120. Additionally, each of the left and right sides of the passenger support parts 130 may be connected to a corresponding one of the front and rear sides of the side support parts 110.

Specifically, the side support part 110 and the bottom support part 120 may be formed to be integrated with each other, and a boundary portion between the side support part 110 and the bottom support part 120 may be folded while sharing the structure of the fill chamber b.

Further, each of the lower ends of the passenger support parts 130 may be connected to a corresponding one of the front and rear sides of the bottom support part 120 by a sewing method, and each of the left and right sides of the passenger support parts 130 may be connected to a corresponding one of the front and rear sides of the side support parts 110 by a sewing method. In this manner, the cushion 100 may be implemented in a cylindrical shape with an open top.

Additionally, as shown in FIG. 5, in the present disclosure, since an inflator 200 is connected to the side support part 110, gas may be first supplied to the side support part 110, and then the gas may be supplied to the bottom support part 120.

Specifically, each of the inflators 200 may be connected to a corresponding one of the upper ends of the side support parts 110 located on the left and right sides, thereby supplying gas to the inside of each of the side support parts 110.

Accordingly, the gas provided from the inflator 200 may flow forwards and rearwards at the upper end of the side support part 110 to expand the side support part 110. Next, the gas, flowing forwards and rearwards in the side support part 110, may flow along the edge portion of the bottom support part 120 to expand the bottom support part 120. Here, the side support part 110 may be formed in a trapezoidal shape to implement a cylindrical structure.

Figure 7:
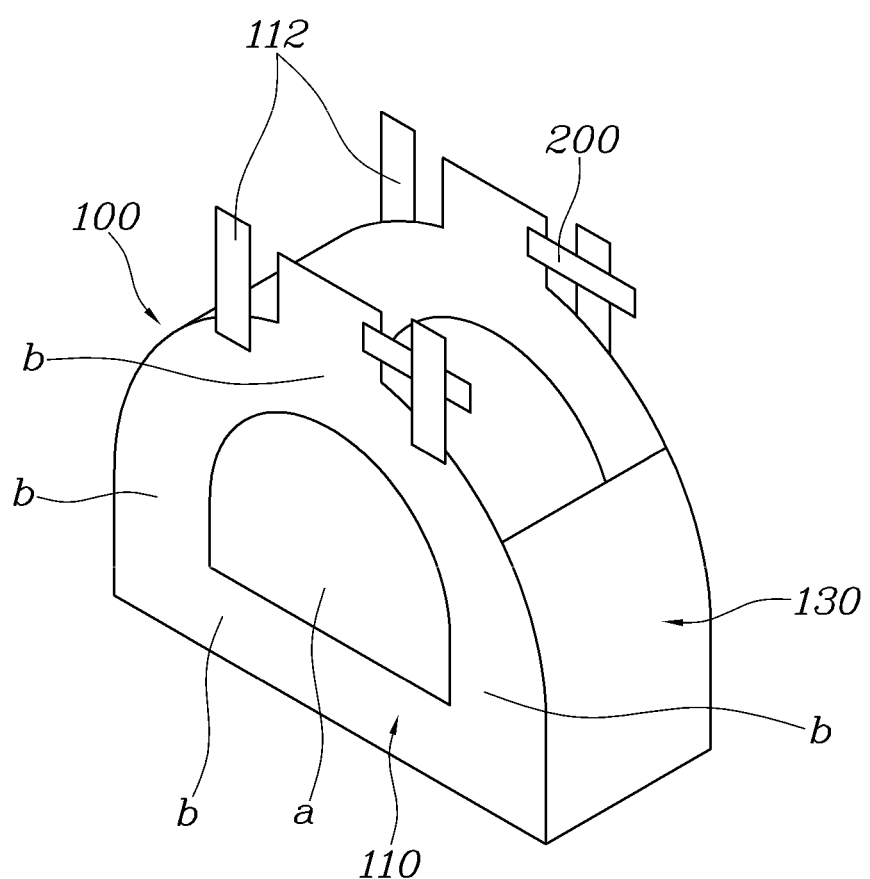
FIG. 7 is a view showing a shape of a second embodiment of the airbag according to the present disclosure.
Figure 8:
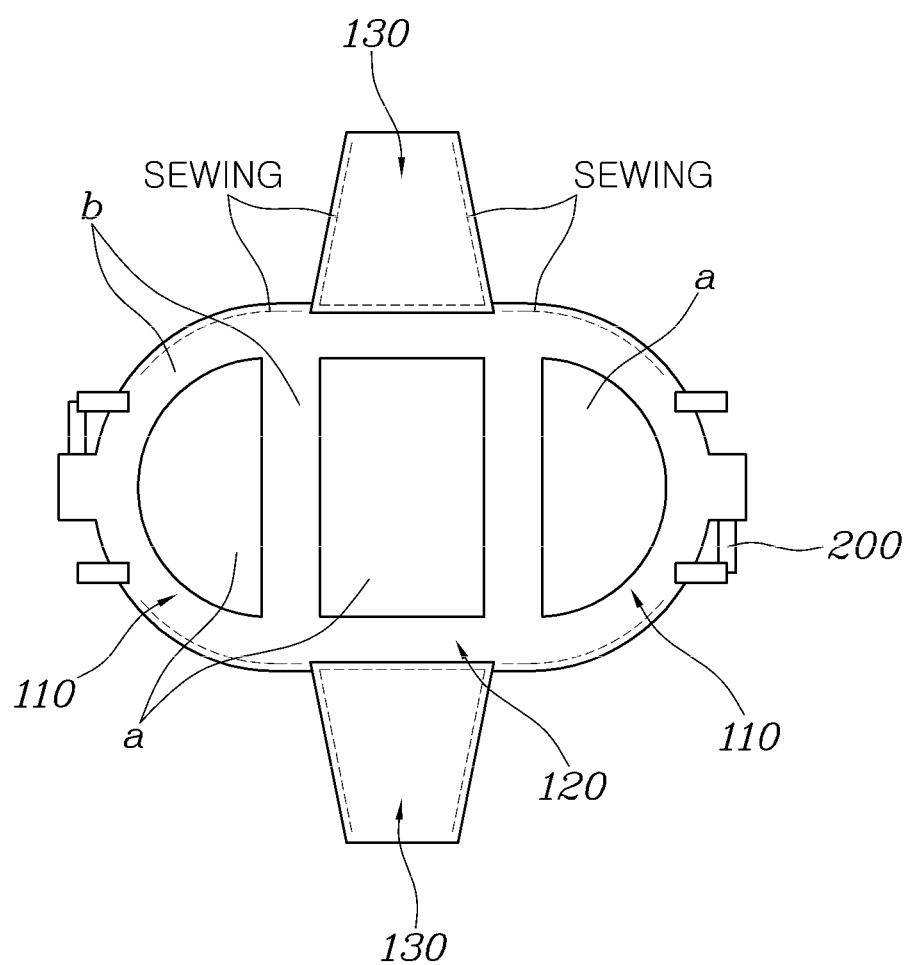
FIG. 8 is a view showing an unfolded structure in which a passenger support part in FIG. 7 is formed of a panel.

For reference, FIG. 7 is a view showing a shape of a second embodiment of the airbag according to the present disclosure, and FIG. 8 is a view showing an unfolded structure in which the passenger support part 130 in FIG. 7 is formed of a panel. Here, the side support part 110 may be formed in a hemispherical shape to implement a cylindrical structure. In this structure as well, the passenger support part 130 may be implemented as a panel structure made of a fabric material.

Figure 10:
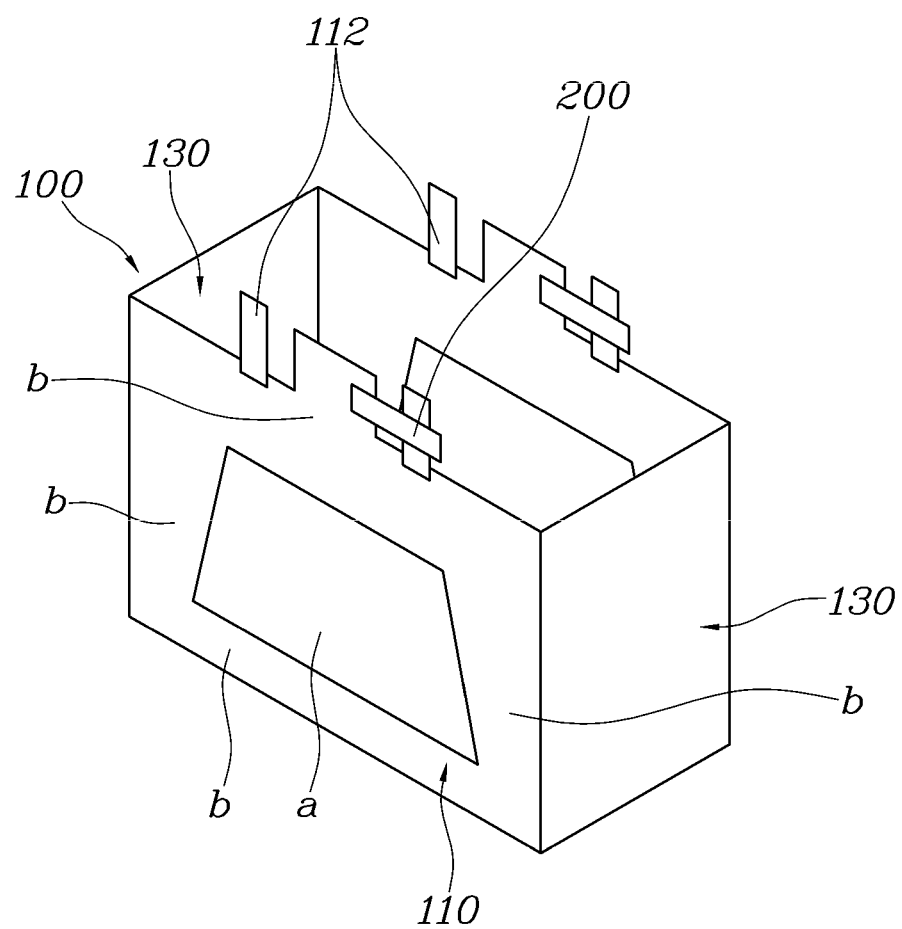
FIG. 10 is a view showing a shape of a third embodiment of the airbag according to the present disclosure.
Figure 11:
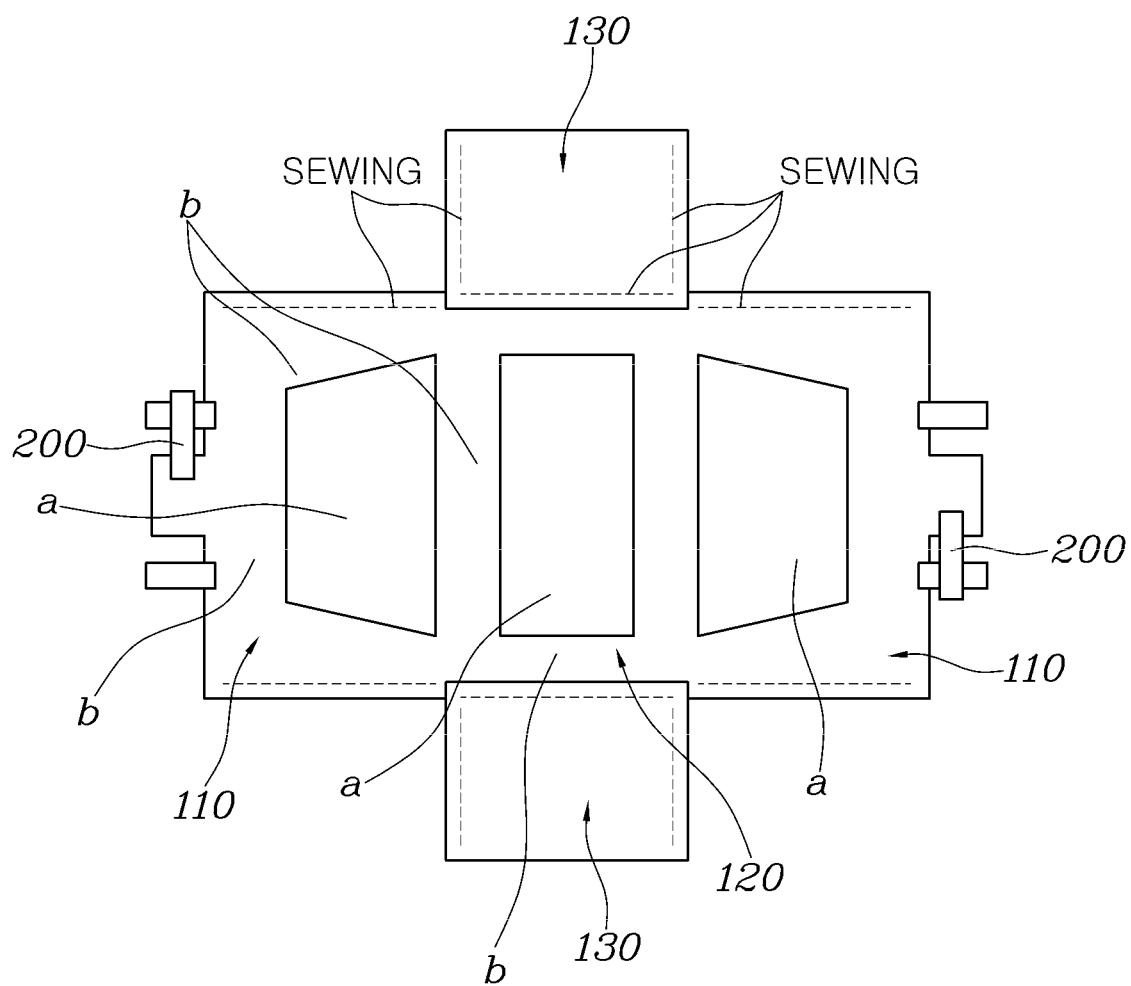
FIG. 11 is a view showing an unfolded structure in which a passenger support part in FIG. 10 is formed of a panel.

FIG. 10 is view showing a shape of a third embodiment of the airbag according to the present disclosure, and FIG. 11 is a view showing an unfolded structure in which the passenger support part 130 in FIG. 10 is formed of a panel. Here, the side support part 110 may be formed in a quadrangular shape, preferably a rectangular shape to implement a cylindrical structure. In this structure as well, the passenger support part 130 may be implemented as a panel structure made of a fabric material.

Figure 6:
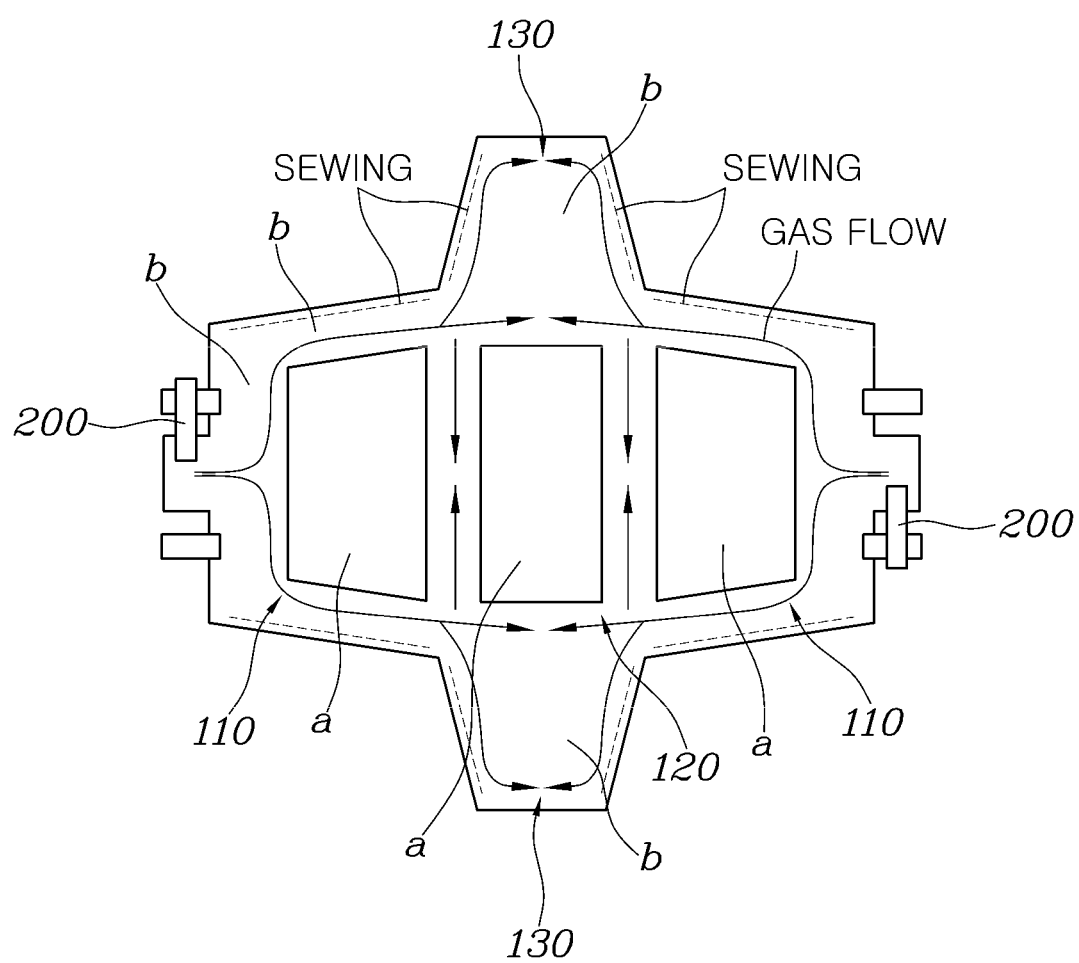
FIG. 6 is a view showing an unfolded structure in which the passenger support part in FIG. 2 is formed in a shape of a fill chamber.

Meanwhile, FIG. 6 is a view showing an unfolded structure in which the passenger support part 130 in FIG. 2 is formed in the shape of the fill chamber b.

Referring to the drawing, in the present disclosure, the passenger support parts 130, respectively forming the front and rear sides of the cushion 100, may be formed of the fill chamber b filled with gas.

That is, the passenger support part 130 may be a part directly supporting the body of the passenger. Further, the passenger support part 130 may be integrally formed in the form of the fill chamber b filled with gas to restrain the body of the passenger.

In the case of such a structure, the side support parts 110, respectively forming the left and right sides of the cushion 100, the bottom support part 120, forming the bottom of the cushion 100, and the passenger support parts 130 may be formed to be integrated with each other. Accordingly, each of the left and right sides of the passenger support parts 130 may be connected to a corresponding one of the front and rear sides of the side support parts 110.

Specifically, since the side support part 110 and the bottom support part 120 are formed to be integrated with each other, a boundary portion between the side support part 110 and the bottom support part 120 may be folded while sharing the structure of the fill chamber b. In addition, since the bottom support part 120 is formed to be integrated with the passenger support part 130, a boundary portion between the passenger support part 130 and the bottom support part 120 is also folded while sharing the structure of the fill chamber b.

Further, each of the left and right sides of the passenger support parts 130 may be connected to a corresponding one of the front and rear sides of the side support parts 110 by a sewing method, thereby implementing the cushion 100 formed in a cylindrical shape with an open top.

In addition, as shown in FIG. 6, according to the present disclosure, since the inflator 200 is connected to the side support part 110, gas may be first supplied to the side support part 110, and then the gas may be supplied to the bottom support part 120 and the passenger support part 130.

Specifically, each of the inflators 200 may be connected to a corresponding one of the upper ends of the side support parts 110 located on the left and right sides, thereby supplying gas to the inside of each of the side support parts 110.

Accordingly, the gas provided from the inflator 200 may flow forwards and rearwards at the upper end of the side support part 110 to expand the side support part 110. Next, the gas, flowing forwards and rearwards in the side support part 110, flows along the edge portion of the bottom support part 120 and the inside of the passenger support part 130, thereby expanding the bottom support part 120 and the passenger support part 130.

Figure 9:
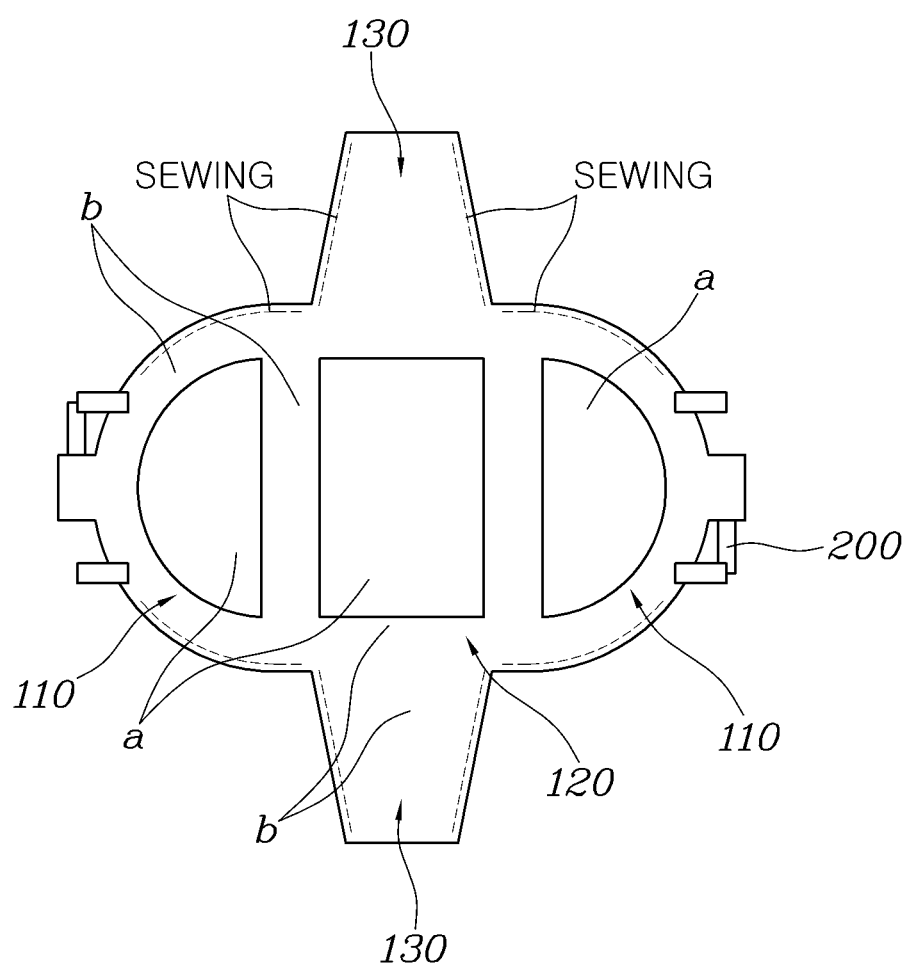
FIG. 9 is a view showing an unfolded structure in which the passenger support part in FIG. 7 is formed in a shape of a fill chamber.

FIG. 9 is a view showing an unfolded structure in which the passenger support part 130 in FIG. 7 is formed in the shape of the fill chamber b. Here, in the structure of the cushion 100 according to the second embodiment, the passenger support part 130 may be formed in the shape of the fill chamber b.

Figure 12:
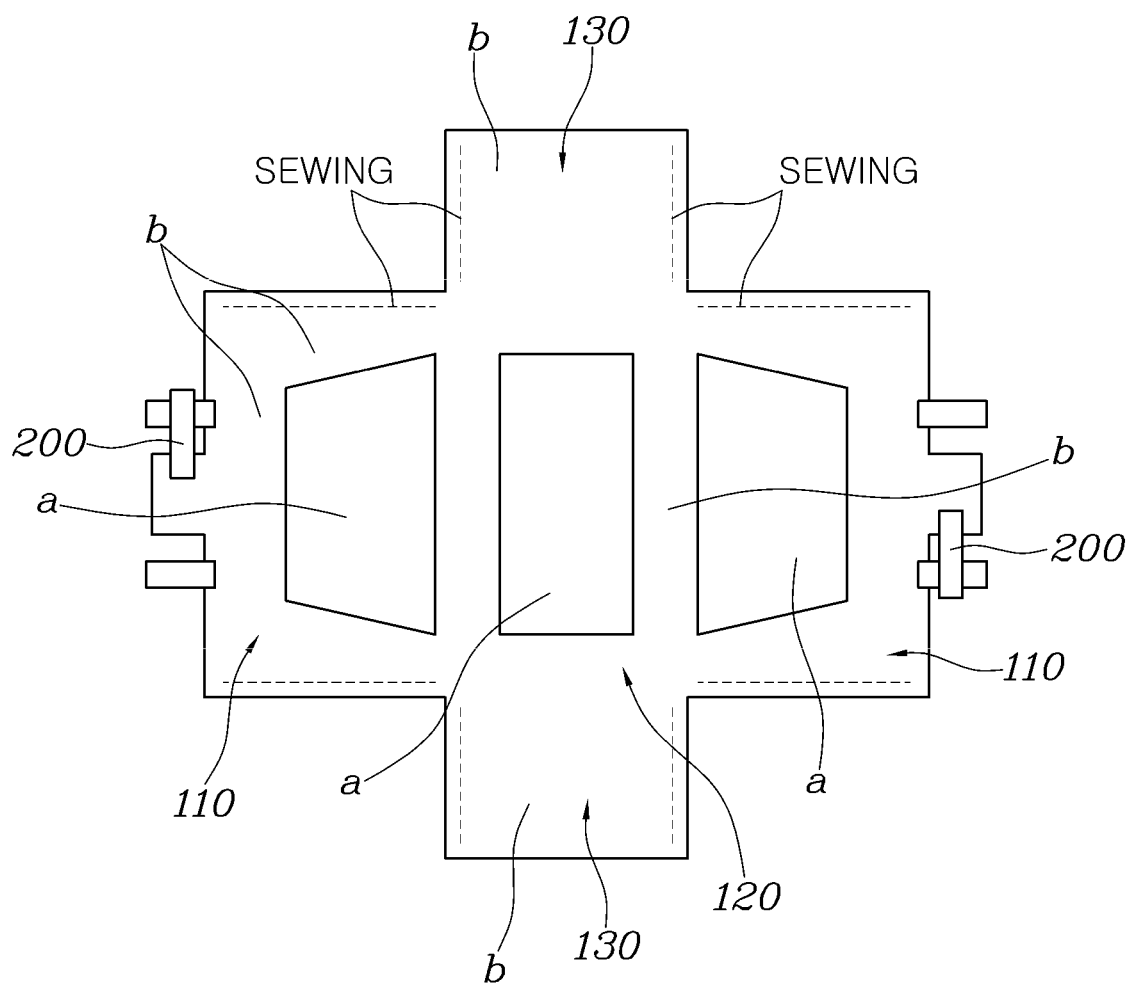
FIG. 12 is a view showing an unfolded structure in which the passenger support part in FIG. 10 is formed in a shape of a fill chamber.

Further, FIG. 12 is a view showing an unfolded structure in which the passenger support part 130 in FIG. 10 is formed in the shape of the fill chamber b. Here, in the structure of the cushion 100 according to the third embodiment as well, the passenger support part 130 may be formed in the shape of the fill chamber b.

Figure 13:
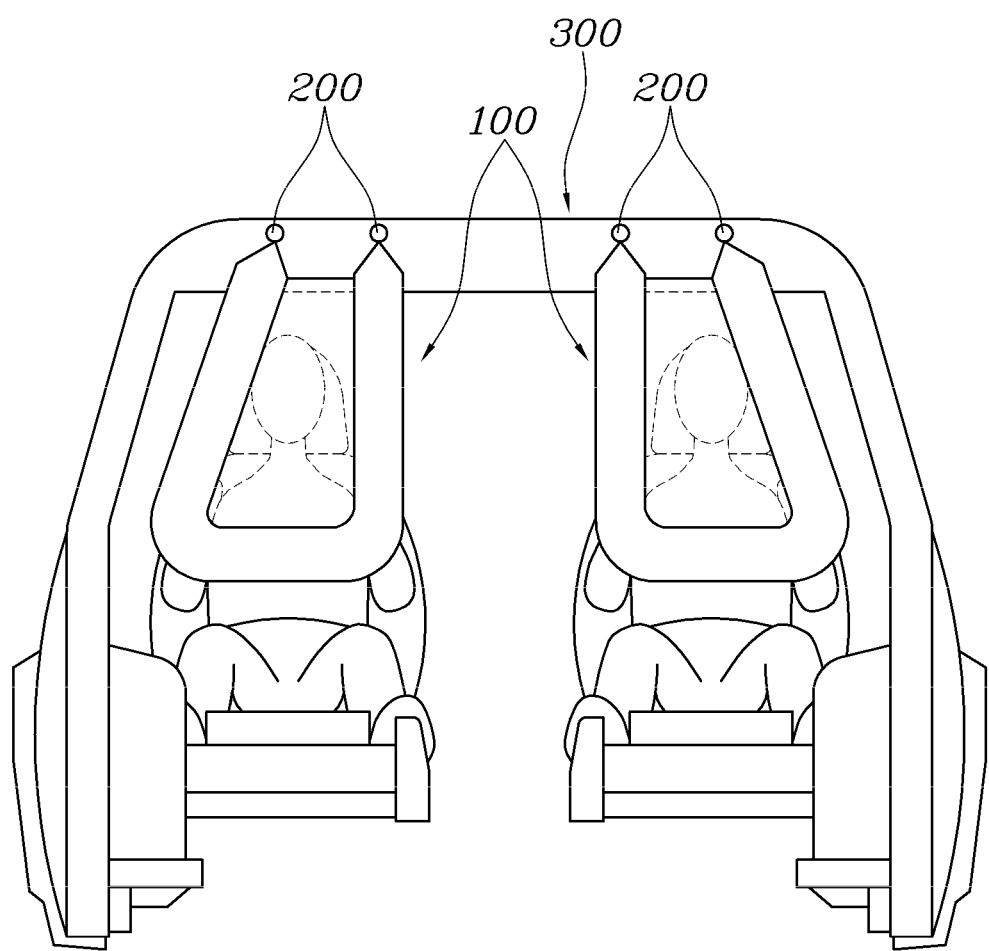
FIG. 13 is a view showing a mounting position of the airbag according to the present disclosure.

Meanwhile, FIG. 13 is a view showing a mounting position of the airbag according to the present disclosure.

Referring to the drawing, the cushion 100 may be installed in each of the seats disposed along the left-and-right width direction.

For example, when two seats are installed on the left and right sides in the interior of the vehicle, the cushion 100 may be configured to be deployed for each of the passengers seated on the left and right seats, thereby individually protecting the passengers.

Particularly, the front and rear surfaces of the cushion 100 may have the fill chambers b filled with gas and configured to form a "U" shape.

This is, when the passenger support parts 130, respectively forming the front and rear sides of the cushion 100, are formed in the panel structure, the fill chambers b at the front and rear ends of the side support parts 110, respectively forming the left and right sides of the cushion 100, may become the left-and-right fill chambers b of the passenger support part 130, and the fill chambers b at the front and rear ends of the bottom support part 120, forming the bottom of the cushion 100, become the lower fill chambers b of the passenger support part 130, thereby forming a "U" shape.

Figure 14:
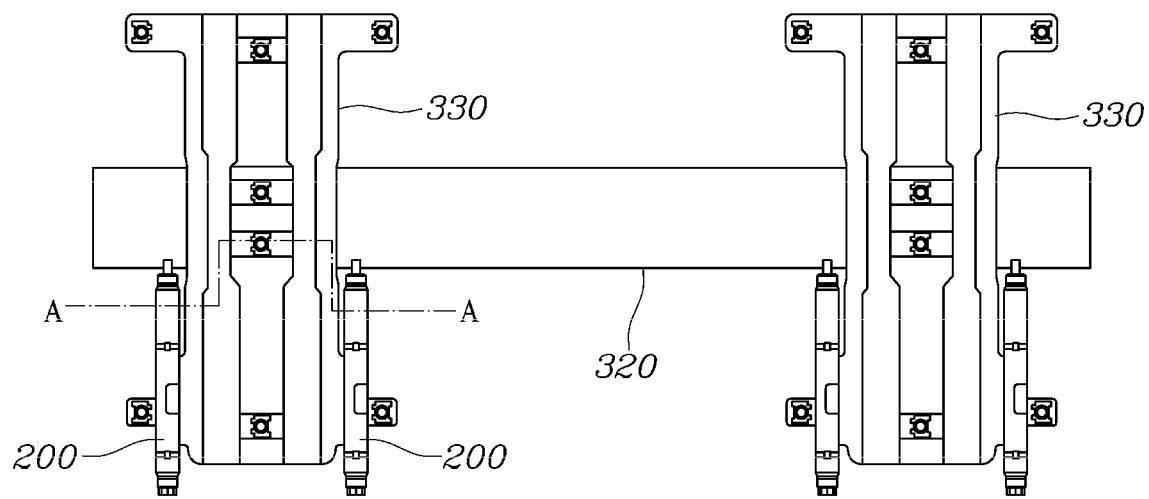
FIG. 14 is a view showing a coupling relationship between a module housing bracket, on which the cushion of the present disclosure is mounted, and a roof part.
Figure 15:
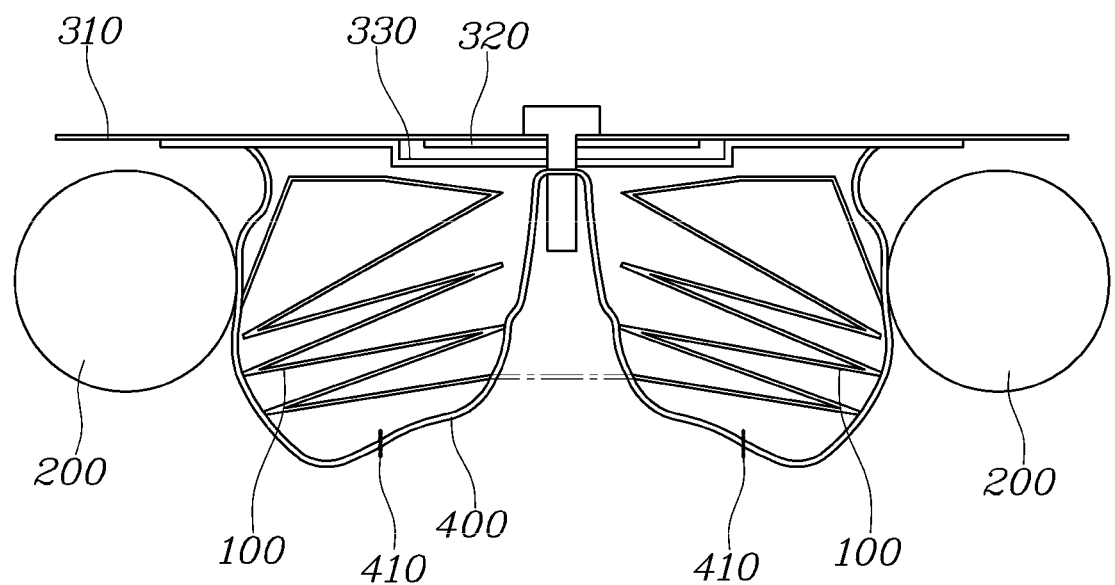
FIG. 15 is a cross-sectional view taken along line A-A in FIG. 14.

In addition, FIG. 14 is a view showing a coupling relationship between the module housing bracket 330, on which the cushion 100 of the present disclosure is mounted, and the roof part 300. FIG. 15 is a cross-sectional view taken along line A-A in FIG. 14.

Referring to the drawings, in the present disclosure, a cushion cover 400 may be coupled to the roof part 300, and the cushion 100 integrally formed between the roof part 300 and the cushion cover 400 may be distributed and accommodated on the left and right sides.

For example, a roof cross panel 320 may be fixed to the left and right sides on a bottom surface of a roof panel 310, and the module housing bracket 330 may be assembled to a bottom surface of the roof cross panel 320.

Further, a middle portion of the cushion cover 400 may be coupled to a lower portion of the module housing bracket 330 by a mounting stud, and the opposite ends of the cushion cover 400 may be supported by the module housing bracket 330, thereby forming a space, in which the cushion 100 is accommodated, between the module housing bracket 330 and the cushion cover 400 on the left and right sides. For reference, the inflator 200 may be coupled to the module housing bracket 330.

Accordingly, the cushion 100 may be folded in a zigzag shape, and the folded cushion 100 may be distributed and accommodated in the left-and-right spaces. In this case, a tear line 410 may be formed at each of the lower ends of the cushion covers 400 on the left and right sides, and as such, the cushion 100 distributed and accommodated therein may tear the tear line 410 and may be deployed downwards.

That is, as described above, each of the cushions 100 may be distributed and accommodated in a corresponding one of the cushion covers 400 on the left and right sides. Accordingly, when the cushion 100 is deployed, the opposite side support parts 110, respectively forming the left and right sides of the cushion 100, are simultaneously deployed to rapidly deploy the cushion 100 while maintaining the cylindrical shape of the cushion 100, thereby quickly and safely restraining the body of the passenger.

Hereinafter, an operation process of the roof-mounted airbag according to the present disclosure will be described.

Referring to FIGS. 3 to 5, in the event of vehicle collision, the inflator 200 may explode to generate gas. Next, the gas is supplied to the side support part 110, and the side support part 110 starts to be expanded and deployed, and as such, the cushion 100 embedded in the roof part 300 is deployed downwards.

Next, the gas may flow to the bottom support part 120 connected to the side support part 110, and the bottom support part 120 may be expanded and deployed, thereby deploying the cushion 100 between passengers facing each other in a cylindrical shape, as shown in FIGS. 3 and 5.

Next, as the body of a passenger seated in the opposite direction to the collision is tilted in the collision direction, the head of the passenger may be placed on the passenger support part 130 forming the rear surface of the cushion 100.

In this case, since the left and right upper ends of the cushion 100 formed in a cylindrical shape are respectively fixed to the roof part 300, it is possible to minimize the movement of the cushion 100 toward a passenger in the collision direction, thereby stably restraining the body of the passenger placed on the cushion 100.

Next, the chest of the passenger placed on the cushion 100 may be supported by the portion of the fill chamber b at the lower end of the boundary portion between the passenger support part 130 and the bottom support part 120.

That is, the structure of the fill chamber b may be implemented in the left-and-right longitudinal direction at the lower end of the passenger support part 130, and as such, the chest of the passenger may be stably supported by the cushion 100 and collision energy is absorbed, thereby safely protecting the passenger.

As described above, in the present disclosure, the cushion 100 may be formed in the cylindrical shape, and the left and right upper ends of the cushion 100 may be respectively fixed to the roof part 300 to minimize movement of the cushion 100, thereby stably restraining the body of the passenger placed on the cushion 100 and reducing the risk of injury to the passenger.

As is apparent from the above description, according to the present disclosure, a cushion may be formed in the shape of a housing, and each of the left and right upper ends of the cushion may be fixed to a roof to minimize the movement of the cushion, thereby having an effect of stably restraining the body of a passenger placed on the cushion and reducing the risk of injury to the passenger.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A roof-mounted airbag comprising:
a cushion configured to be deployed downwards between passengers facing each other while left and right upper ends of the cushion are fixed to a roof part, the cushion once deployed forming an empty space in a middle of the cushion; and
an inflator configured to provide gas to an inside of the cushion,
wherein the cushion is formed in a shape with an open top toward the roof part, and the cushion comprises side support parts respectively formed on left and right sides of the cushion, a bottom support part forming a bottom of the cushion, and passenger support parts respectively formed on front and rear sides of the cushion,
wherein the side support parts, the bottom support part, and the passenger support parts form the empty space,
wherein each of the side support parts and the bottom support part have an inactive zone not filled with gas and an edge portion formed around the inactive zone, the edge portion comprising a fill chamber that is filled with gas,
wherein each of the passenger support parts comprises the fill chamber that is filled with gas,
wherein when the cushion is deployed, the inflator injects gas into the fill chambers of the side support parts, the bottom support part, and the passenger support parts,
wherein the inflator is connected to one of the side support parts, and
wherein gas injected through the inflator forms a flow which is branched by the inactive zone of the one of the side support parts,
wherein the roof part comprises a cushion cover coupled to the roof part, and
wherein the cushion integrally formed between the roof part and the cushion cover is distributed and accommodated on left and right sides.

2. The roof-mounted airbag according to claim 1, wherein the left and right upper ends of the cushion are fixed to front and rear sides of the roof part.

3. The roof-mounted airbag according to claim 1, wherein the cushion and the roof part are connected to each other using a mounting tab.

4. The roof-mounted airbag according to claim 1, wherein the cushion is formed in a tubular shape with an open top.

5. The roof-mounted airbag according to claim 1, wherein each of the side support parts has an upper end comprising the fill chamber that is filled with gas.

6. The roof-mounted airbag according to claim 1, wherein:
each of the side support parts has a central portion comprising the inactive zone that is not filled with gas.

7. The roof-mounted airbag according to claim 1, wherein the bottom support part has front and rear ends respectively facing passengers, each of the front and rear ends comprising the fill chamber that is filled with gas.

8. The roof-mounted airbag according to claim 1, wherein:
the bottom support part has a central portion comprising the inactive zone that is not filled with gas.

9. The roof-mounted airbag according to claim 1, wherein each of the passenger support parts has a panel structure made of a fabric material.

10. The roof-mounted airbag according to claim 9, wherein:
the side support parts and the bottom support part are integrally formed,
the passenger support parts have lower ends, each of the lower ends being connected to a corresponding one of front and rear sides of the bottom support part, and
the passenger support parts have left and right sides, each of the left and right sides being connected to a corresponding one of front and rear sides of the side support parts.

11. The roof-mounted airbag according to claim 10, wherein gas injected through the inflator is first supplied to the one of the side support parts and then the gas is supplied to the bottom support part.

12. The roof-mounted airbag according to claim 10, wherein the side support parts are in a quadrangular shape.

13. The roof-mounted airbag according to claim 1, wherein each of the passenger support parts forms a corresponding one of front and rear sides of the cushion.

14. The roof-mounted airbag according to claim 13, wherein:
the side support parts, the bottom support part, and the passenger support parts are integrally formed, and
the passenger support parts have left and right sides, each of the left and right sides being connected to a corresponding one of front and rear sides of the side support parts.

15. The roof-mounted airbag according to claim 14, wherein gas injected through the inflator is first supplied to the one of the side support parts and then the gas is supplied to the bottom support part and the passenger support part.

16. The roof-mounted airbag according to claim 1, wherein the cushion is configured to be installed with respect to seats disposed in a left-and-right width direction.

17. The roof-mounted airbag according to claim 1, wherein the cushion has a side surface formed in a cylindrical shape having one of a trapezoidal shape, a hemispherical shape, and a rectangular shape.

18. The roof-mounted airbag according to claim 1, wherein each of front and rear surfaces of the cushion comprises the fill chamber that is filled with gas, the fill chamber forming a "U" shape.

19. A vehicle comprising the roof-mounted airbag according to claim 1.

* * * * *